United States Patent [19]

Roche

[11] Patent Number: 4,721,967

[45] Date of Patent: Jan. 26, 1988

[54] ELECTRON GUN PRINTER HAVING WINDOW-SEALING CONDUCTIVE PLATES

[75] Inventor: Michel Roche, Dijon, France

[73] Assignee: Commissariat A L'Energie Atomique, Paris, France

[21] Appl. No.: 855,794

[22] Filed: Apr. 24, 1986

[30] Foreign Application Priority Data

Apr. 26, 1985 [FR] France ................................ 85 06451

[51] Int. Cl.[4] ........................ G01D 9/42; G01D 15/06; H01J 33/00

[52] U.S. Cl. ................................ 346/110 V; 346/158; 346/161; 358/302; 313/420

[58] Field of Search ........... 346/110 R, 110 V, 107 R, 346/108, 161, 158, 159; 358/300, 302; 313/420

[56] References Cited

U.S. PATENT DOCUMENTS

| | | | |
|---|---|---|---|
| 3,469,139 | 9/1969 | Calvin | 313/420 |
| 3,588,565 | 6/1971 | Trump | 313/74 |
| 3,788,892 | 7/1974 | van Raalte et al. | 117/217 |
| 4,359,745 | 11/1982 | Reid | 346/110 R |
| 4,435,064 | 3/1984 | Tsukada | 346/107 R |

FOREIGN PATENT DOCUMENTS

| | | |
|---|---|---|
| 2056965 | 5/1971 | Fed. Rep. of Germany . |
| 2501885 | 7/1976 | Fed. Rep. of Germany . |
| 1276629 | 12/1960 | France . |

OTHER PUBLICATIONS

"Design of Foil Windows for Wide-Beam Electron Guns", by Fedorov et al., Instruments and Experimental Techniques, vol. 24, No. 6, pp. 1486-1489 (1981).

"Facsimile Printing Tubes and Their Applications", by Miyazaki, Japan Electronic Engineering, vol. RT-209, No. 28, pp. 27-30 (1969).

*Primary Examiner*—E. A. Goldberg
*Assistant Examiner*—Mark Reinhart
*Attorney, Agent, or Firm*—Michael N. Meller

[57] ABSTRACT

An electron gun printer, having an electrically insulating vacuum enclosure, in which is located the gun, which gun emits an electron beam to a printing medium outside the enclosure, a focussing anode for modulating the intensity of the beam, deflecting coils or plates controlling an alternating movement of the beam to scan the lines of the printing medium, motor-driver rollers for controlling a displacement of the printing medium and a clock for synchronizing the anode and deflecting coils. One enclosure wall has at least two rows of windows arranged in staggered manner parallel to the scanned lines and respectively sealed by conductive plates, which are transparent to the electrons. The printer also includes plates or coils for deflecting the beam so that the beam alternately scans each row of windows during the displacement of the medium.

12 Claims, 6 Drawing Figures

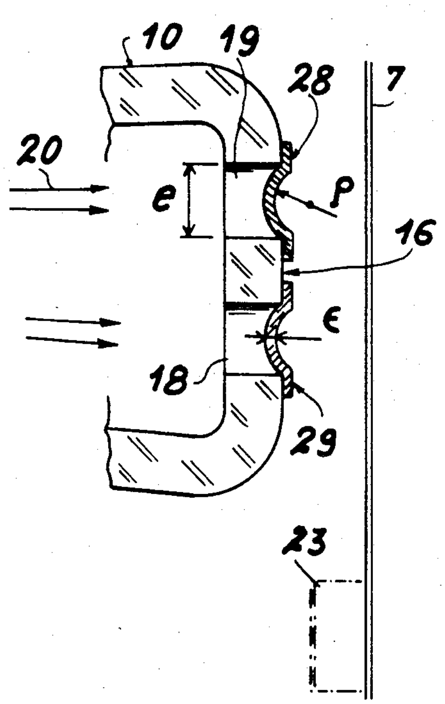
FIG. 3
FIG. 4
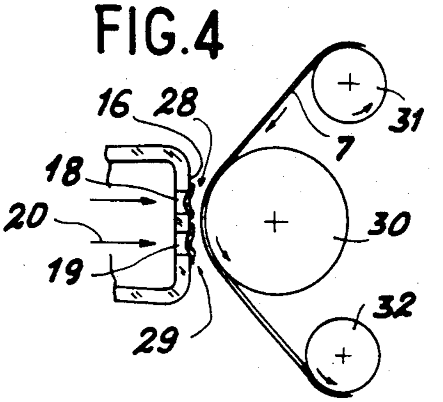
FIG. 6
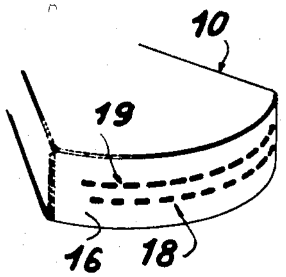
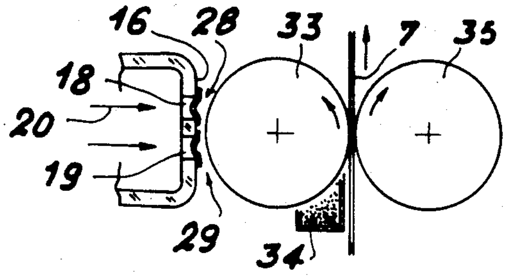
FIG. 5

ELECTRON GUN PRINTER HAVING WINDOW-SEALING CONDUCTIVE PLATES

BACKGROUND OF THE INVENTION

The present invention relates to an electron gun printer. It is applicable to the recording of drawings or texts on a printing medium. It can be used as a computer peripheral or in drafting, drawing or text processing machines.

At present there are numerous printers operating according to different principles:

mechanical percussion printers operating on the typewriter principle;

thermographic printers, in which a sheet of special thermographic paper passes in front of static heating printing heads;

photoelectric printers using the operating principle of photocopiers;

spark-operated printers, where sparks destroy a metal coating deposited on the paper;

magnetic ink printers, in which an inking roller is locally magnetized by a series of fixed heads arranged parallel to a generatrix of the roller, whereby the ink magnetized in this way on the roller in accordance with the drawings or text to be obtained is then deposited on a sheet of paper; laser printers, in which a laser beam of modulated intensity is deflected along an alternating scanning line in front of a photoconductive roller, onto which are attracted ink particles which are then transferred to a paper sheet passing in a direction perpendicular to the scanning line;

photographic printers, in which a sheet of paper coated with a photosensitive layer passes in front of a monodimensional cathode ray tube, in a direction perpendicular to the scanning line of the spot emitted by the electron gun of the tube.

All the printers operating according to known principles suffer from numerous disadvantages, i.e. they require the use of a specific printing medium, their structure and operation are complicated, particularly for mechanical printers, while their cost is generally high.

In order to be able to use printing media of different types and simplify the structure of the printers described hereinbefore, it is also known to e.g. produce a printer with the aid of a cathode ray tube incorporating an electron gun, means making it possible to scan the electron beam in a plane along a rectilinear window closed by a plate which is transparent to the electrons. This plate is shaped like a channel returning towards the inside of the tube. This tube makes it possible to print on different media and can in particular be used in facsimile transmission machines, in which, apart from the line scan or horizontal sweep performed by the electronic beam, there is a frame or raster scan or vertical sweep of the printing medium. For example, such a printer is described in the journal EDN, vol. 14, No. 2, Jan. 15, 1969 (DENVER, U.S.A.). However, this type of printer suffers from the disadvantage of having a rectilinear window of considerable length. This window is in fact closed by a plate, which must have a very limited thickness in order that it be transparent to the electrons, while being very strong, because an ultrahigh vacuum is produced within the cathode ray tube. It is therefore difficult to find a structure which is very rigid and onto which the window can be fixed and which must necessarily stay thin. Thus, the dimensional variations of this structure under the effect of temperature or atmospheric pressure are transmitted to the window and may lead to the destruction thereof.

SUMMARY OF THE INVENTION

The invention aims at obviating these disadvantages and more particularly at providing an electron gun printer in which there is no longer a single window and instead several windows are arranged in rows, so as to considerably reduce the size of the windows, so that the metal plates closing them have a reduced thickness. Thus, these plates are much more transparent to the electrons, while being able to resist the pressure differences to which they are exposed.

The present invention relates to an electron gun printer comprising an electrically insulating vacuum enclosure, in which is located the gun, which emits an electron beam to a printing medium outside the enclosure, means for modulating the intensity of the beam, means for controlling an alternating movement of the beam so as to obtain a line scan of the printing medium, means for controlling a displacement of the printing medium, so as to obtain a raster or frame scan thereof, and means connected to the line scanning means and to the means for synchronizing these, wherein one wall of the enclosure, facing the printing medium and adjacent thereto, has at least two rows of windows parallel to the scanned lines and respectively closed by conductive plates which are transparent to the electrons, the windows of one row being staggered with respect to the windows of the other row, the printer also having beam deflecting means connected to the synchronization means in such a way that the beam alternately scans each row of windows during the displacement of the support.

According to another feature, each window is shaped like a narrow port, which is elongated in the direction of the scanning lines, the conductive plate closing the window being shaped like a channel with a semicircular cross section returning towards the inside of the enclosure, each plate having a thickness which is compatible with the pressure difference between the exterior and the interior of the enclosure.

According to another feature, the enclosure wall having the rows of windows is shaped like an elongated flat tape or strip parallel to the scanned lines.

According to another feature, the enclosure wall having the rows of windows is shaped like a tape or strip, whose cross section parallel to the scanning lines is curved towards the outside of the enclosure.

According to another feature, the printing medium being a sheet arranged parallel to the tape, the control means for the displacement of the support cause a continuous linear movement of the sheet in a direction perpendicular to the rows of windows.

According to another feature, the sheet is made from a material which can be negatively charged under the impact of the beam electron, the printer having means for developing the electrical image of the thus charged sheet using a developing agent constituted by positively charged visible particles.

According to another feature, the sheet has at least one photosensitive layer facing the windows.

According to another feature, the sheet has at least one layer of thermosensitive material facing the windows.

According to another feature, the sheet has at least one layer of a material sensitive to ultraviolet rays facing the windows.

According to another feature, the printing medium being a sheet, the printer comprises a rotary roller whose axis is parallel to the rows of windows, the roller being negatively chargeable under the impact of the electron beam so as to deposit positively charged visible particles on the sheet.

According to another feature, the printer comprises means for reducing the intensity of the beam in the case where the control means stop the alternating movement of the beam.

BRIEF DESCRIPTION OF THE DRAWINGS

The invention is described in greater detail hereinafter relative to non-limitative embodiments and the attached drawings, wherein:

FIG. 3 A partial lateral section of the printer, in the vicinity of the windows, for a first variant of the first embodiment of the printer.

FIG. 4 is another partial lateral section of the printer for a second variant of the first embodiment.

FIG. 5 is another partial lateral section of the printer for a third variant of the first embodiment.

FIG. 6 shows diagrammatically and partially a second embodiment of the printer.

DETAILED DESCRIPTION OF THE PREFERRED EMBODIMENTS

Figure 1:
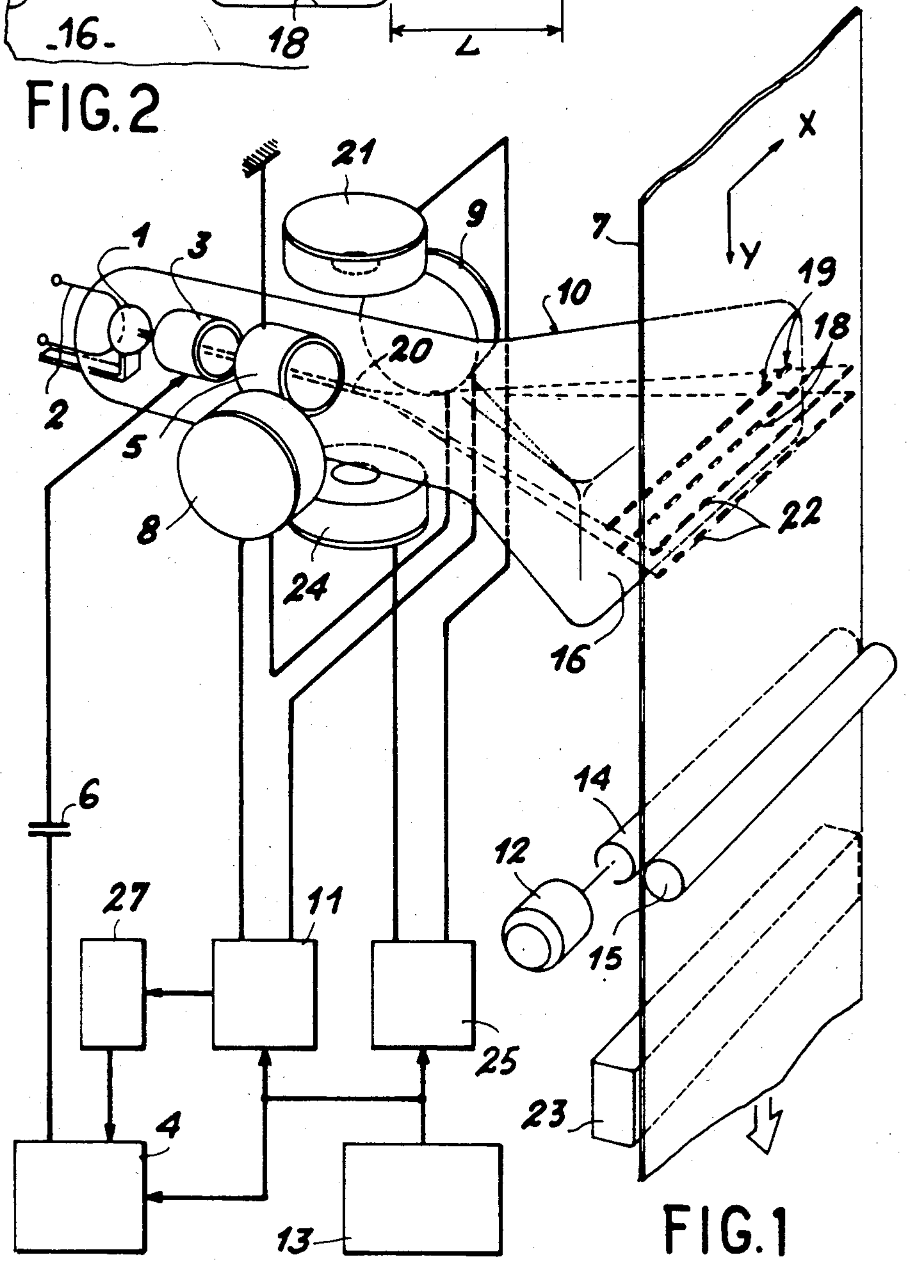
FIG. 1 shows diagrammatically a first embodiment of a printer according to the invention, which embodiment has several variants.

FIG. 1 diagrammatically shows an electron gun printer according to a first embodiment of the invention for different variants. This printer comprises an electron gun, which is not shown in detail in the drawings, whereby the gun can be formed in per se known manner by a cathode 1 heated by a filament 2. The printer also comprises means for modulating the intensity of the electron beam emitted by the cathode. These modulating means are e.g. constituted by a concentrating or focussing anode 3, connected to modulating means 4. An accelerating anode 5 is placed along the path of the beam downstream of the concentrating electrode 3. The modulating means 4, for example, supply video-type signals, which are applied to the concentrating electrode 3 via a condenser 6.

The shape of the video modulating signals is obviously dependent on the light intensities of the different points of each scanning line of a text or image which is to be produced on the printing medium, to be described hereinafter. The means for controlling the alternating movement of the beam can, for example, be constituted by two electromagnetic coils 8, 9 arranged on either side of a tight enclosure 10 containing the electron gun and the concentrating and accelerating electrodes. The vacuum is produced in the tight enclosure. The electromagnetic coils 8,9 are connected to line scan control means 11, for example, constituted by a sawtooth voltage generator. These coils could obviously be replaced by electrostatic deflection control plates. Means make it possible to control the linear, continuous displacement of the printing medium 7, so as to obtain a frame or raster scan thereof. The printer also comprises means 13 for synchronizing the line and frame scans. The means making it possible to control the displacement of the printing medium 7 can be formed, for example, by a direct current motor 12 controlling the rotation of one or more drive rollers 14, 15 of medium 7. The synchronization means 13 can be constituted by a clock supplying synchronization pulses for the modulation means 4 and the sawtooth voltage generator 11.

Wall 16 of the tight enclosure 10, positioned facing the printing medium 7 and adjacent thereto, comprises two rows of parallel windows 18, 19, which are staggered and closed by metal plates transparent to the electrons and being in the form of channels, as will be shown hereinafter. In this embodiment, part 16 comprising the windows is in the form of a flat tape or strip, elongated parallel to the scanned lines 22.

The printer also comprises means for controlling an alternating movement of the beam, so as to obtain a line scan of a printing medium 7 moving in front of a wall 16 of the tight enclosure, in a linear movement which will be described hereinafter.

This printer finally comprises deflecting means constituted by deflecting plates or coils 21, 24 connected to another sawtooth voltage generator 25. This generator is connected to the synchronization means 13 and makes it possible to alternately control the scanning of each row of windows.

In this first embodiment, the printing medium 7 is a sheet facing the window and parallel to the plane of wall 17 receiving the beam electrons. The means for controlling the displacement of the medium bring about a linear movement of the sheet, parallel to the scan lines 22, in direction Y, for example, in the direction of the arrow. The scan lins are parallel to the direction X of the rows of windows. In this embodiment and for a first variant thereof, sheet 1 is, for example, a sheet of paper, which is charged by the electrons of the beam at locations depending on the scanning of lines 22, the scanning of the frames and the modulation of the intensity of the beam by modulation means 4. The thus charged sheet then carries the electronic image of the text or drawings to be obtained. This electronic image can be developed, for example, by an ink constituted by positively charged particles, which are fixed to the sheet at the negatively charged points. Per se known means 23 make it possible to apply this magnetic ink to the sheet and also make it possible to bake the ink so that it is fixed to the sheet. These means are more particularly known in connection with photocopiers and are not represented in detail in the drawing.

It is obvious that if sheet 7 moves at a constant speed along axis Y (frame scan), all the surface points of the sheet can be scanned by the electron beam moving at very high speed along axis X (line scan) facing the staggered windows.

According to another variant of this first embodiment of the printer according to the invention, the sheet 7 used is covered with a photosensitive layer facing the window. In this variant, the electron beam deposits energy in the photosensitive layer of the sheet and prints it in the same way as a photograph. However, as the energy of the beam is high, the photographic papers used can be inexpensive.

According to another variant of this first embodiment of the printer, sheet 7 comprises at least one material sensitive to ultraviolet rays or to ionization in general facing the window. In this case, it is the ionization of the electrons which makes it possible to print the layer which is sensitive to the ultraviolet rays.

Finally, according to another variant of this embodiment of the printer, the sheet comprises at least one thermosensitive layer. The text or drawings can be printed thereon either by heating the thermosensitive layer through the electrons, bringing about the melting of the microcapsules containing ink, which ink can thus be released and color the paper, or electrons can be directly deposited within the actual ink contained in the microcapsules, which are then heated for a constant volume, the increase in the pressure of the ink leading to the breaking of the microcapsules and the release of the ink.

Figure 2:
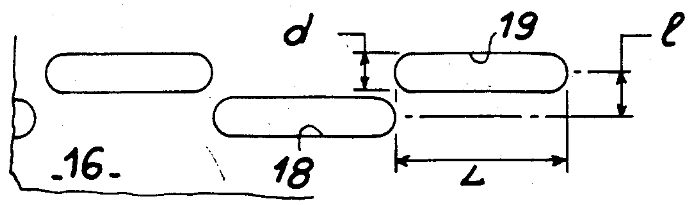
FIG. 2 shows diagrammatically the face of the printer in which are formed the windows of the printer enclosure.

FIG. 2 is a front view of the planar wall 16 of the printer of FIG. 1, in the form of a tape, which has windows 18, 19 arranged in staggered manner. These windows are in the form of slots having equal widths and lengths, the width 1 of each window, for example, being equal to 150 microns, while its length L is close to 10 mm. The spacing d between the rows of windows is approximately 5 mm.

FIG. 3 is a cross section through wall 16 showing windows 18, 19, for example, in a plane perpendicular to the scan lines. One of the windows 18 is shown in broken line form in the drawing. The metal plates closing the windows in a tight manner are transparent to the electrons and are designated 28, 29. Each plate has a thickness compatible with this transparency and with the pressure difference between the inside and outside of the tight enclosure 10 (atmospheric pressure outside, quasi-zero pressure inside). The enclosure is, for example, made from an insulating material, such as glass.

In this embodiment, the printing medium is a sheet 7, placed facing the front 16 of the enclosure having the windows 18, 19. Each metal plate is shaped like a channel with a section returning towards the inside of enclosure 10 and receives the line scan electron beam 20. In this drawing, e is the width of the window, $\epsilon$ the thickness of metal plate 21 closing the window and $\rho$ the radius of curvature of medium metal plate.

Outside the enclosure, the pressure is atmospheric pressure, whereas within it the pressure is close to zero. The semicircular cross section of the channel is ideal for ensuring that the metal plate 21 resists the pressure difference between the inside and outside of the enclosure. If $P_A$ is the pressure outside the enclosure and $P_I$ the pressure within it, it can be said that the difference of the pressures $\Delta P = P_A - P_I$ is close to $P_A = \sigma\epsilon/\rho$. In this relation, $\sigma$ designates the elastic limit of the metal from which the plate closing the window is made and $\epsilon$ designates the thickness of the plate.

The chosen metal can, for example, be titanium, whose elastic limit $\sigma$ at 500° C. is close to 73 kg/mm$^2$, so that the relation $P_A = \sigma\epsilon/\rho$ makes it possible to deduce $\rho/\epsilon = 7300$. With aluminum it is, for example, possible to produce a window of thickness 1 $\mu$m with a radius of curvature $\rho = 200$ $\mu$m. The pressure behavior is then better than 10 bars. Pyrolytic or non-pyrolytic carbon can also be a good material for making the plate.

If the electron gun uses an accelerating voltage of 20 kV, the energy loss of the electrons in the metal plate of the window is close to 9 MeV.cm$^2$/g (mean value between 15 and 20 keV). If it is then considered that one quarter of the energy of the beam is dissipated in the window (i.e. 5 keV). This means that the thickness $\epsilon$ of the metal plate closing the window must be close to 1.2 microns. The radius of curvature of this plate is then close to 8.7 mm. Temperature measurements show that the temperature of the metal plate at the beam impact point is close to 26° C.

FIG. 4 diagrammatically shows another embodiment of the printer according to the invention. This drawing is a lateral section of the enclosure face 16, in the vicinity of windows 18, 19. The same elements carry the same references as in the preceding drawings. In this case, the electron beams 20 traverse windows 18, 19. The electrons strike the metal plates 28, 29 closing the windows and heat the plates. Means, for example, constituted by a roller 30 rotating about an axis, make it possible to keep the printing medium 7 facing the windows and very close thereto. In this embodiment, the printing medium is a sheet covered with a thermosensitive layer in front of the windows. The support displacement control means bring about a linear movement of the sheet, so as to ensure a line scan thereof. These control means are not shown in detail in the drawing and can be constituted by two rotatable rollers 31, 32. For example, roller 31 can make it possible to unwind the sheet to be printed, while the other roller 32 makes it possible to roll up the sheet which has been printed.

FIG. 5 shows diagrammatically and in section another variant of the first embodiment of the printer according to the invention. This section is made laterally, in the vicinity of windows 18, 19, of the enclosure face 16. The printing medium 7 is, for example, a sheet of paper and the printer comprises a rotary roller 33, whose axis is parallel to the scanning plane of the beam. This roller is negatively charged under the impact of the electron beam and then deposits on sheet 7 an ink formed from positively charged particles. For example, the ink can be contained in a reservoir 34. Sheet 7 is driven in translation, for example, by means of roller 33 and a roller 35.

FIG. 6 shows another embodiment of the printer according to the invention, in which case wall 16 of enclosure 10, in which the windows 18, 19 are formed, is shaped like a tape, which is curved with respect to the scan lines, which are not shown in the drawing. Thus, the windows are located on two parallel circular arcs, instead of being located on straight lines, as in the preceding embodiments. The line scan can have a large opening or aperture angle. In this embodiment, the printer performance is increased due to the fact that the electrons strike the plates sealing the windows perpendicular thereto. The printing support passes in front of face 16, in the form of a semicylindrical surface, whose generatrixes are parallel to the support travel direction.

In all the embodiments described, an accidental stoppage of the electron beam scanning could lead to an immobilization of the spot, which could lead to significant heating of the metal plate sealing the window, which plate could then be destroyed. To prevent this, the printer can be provided (FIG. 1) with means 27 (e.g. threshold detection means), connected to the line scan control means 11 for controlling the means 4 for modulating the intensity of the beam, so as to reduce the intensity in the absence of line scanning.

What is claimed is:

1. An electron gun printer comprising an electrically insulating evacuated enclosure which encloses an electron gun for emitting an electron beam toward a printing medium positioned outside said enclosure and means for modulating the intensity of said beam, one wall of said enclosure facing said printing medium and arranged adjacent thereto having formed therein first and second rows of windows arranged in parallel to the scanned lines, each window being closed by a corresponding conductive plate which is transparent to electrons, the windows of said first row being staggered with respect to the windows of said second row, means for controlling an alternating movement of said beam whereby said beam performs a line scan of said printing medium, means for controlling a displacement of said printing medium whereby said beam performs a raster or frame scan of said medium, means for synchronizing said line scanning means and said frame scanning means, and beam deflecting means connected to said synchronization means for deflecting said beam to alternately scan said rows of windows during displacement of said printing medium, wherein each window is in the form of a narrow port elongated in the direction of the scan lines, each conductive plate is shaped like a channel with a semicircular cross-section, the convex side of each plate facing towards the inside of said enclosure, and each plate has a thickness adequate to withstand the pressure difference between the inside and outside of said enclosure.

2. A printer according to claim 1, wherein said one wall having the rows of windows is in the form of a flat, elongated tape extending parallel to the scanned lines.

3. A printer according to claim 1, wherein said one wall having the rows of windows is in the form of a tape which extends parallel to the scan lines and has a cross-section with a shape curved towards the outside of the enclosure.

4. A printer according to claim 2, wherein said printing medium is a sheet positioned parallel to the tape, the support displacement control means bringing about a continuous linear movement of the sheet in a direction perpendicular to the rows of windows.

5. A printer according to claim 4, wherein the sheet is constituted by a material which can be negatively charged under the impact of the beam electrons, the printer having means for developing the electrical image of the thus charged sheet using a developing agent constituted by positively charged visible particles.

6. A printer according to claim 4, wherein said sheet has at least one photosensitive layer facing the windows.

7. A printer according to claim 4, wherein said sheet has at least one thermosensitive material layer facing the windows.

8. A printer according to claim 4, wherein said sheet has at least one layer of a material sensitive to ultraviolet rays facing the windows.

9. A printer according to claim 2, wherein said printing medium is a sheet, the printer further having a rotary roller, whose axis is parallel to the rows of windows, said roller being negatively chargeable under the impact of the electron beam and depositing positively charged visible particles on said sheet.

10. A printer according to claim 2, further comprising means for reducing the intensity of the beam in said case of a stoppage of the means for controlling the alternating movement of the beam.

11. A printer according to claim 3, wherein said printing medium is a sheet positioned parallel to said tape, the medium displacement control means bringing about a continuous linear movement of the sheet in a direction perpendicular to the rows of windows.

12. A printer according to claim 3, further comprising means for reducing the intensity of the beam in the case of a stoppage of said means for controlling the alternating movement of the beam.

* * * * *